(12) United States Patent
Raghavan et al.

(10) Patent No.: US 11,425,647 B2
(45) Date of Patent: Aug. 23, 2022

(54) GROUP WAKE-UP SIGNALING USING SIDELINK ZONE IDENTIFIER

(71) Applicant: QUALCOMM Incorporated, San Diego, CA (US)

(72) Inventors: Vasanthan Raghavan, West Windsor Township, NJ (US); Sony Akkarakaran, Poway, CA (US); Tao Luo, San Diego, CA (US); Junyi Li, Franklin Park, NJ (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/211,626

(22) Filed: Mar. 24, 2021

(65) Prior Publication Data

US 2021/0345244 A1 Nov. 4, 2021

Related U.S. Application Data

(60) Provisional application No. 63/019,679, filed on May 4, 2020.

(51) Int. Cl.
*H04W 52/02* (2009.01)
*H04W 76/14* (2018.01)

(52) U.S. Cl.
CPC ... *H04W 52/0219* (2013.01); *H04W 52/0229* (2013.01)

(58) Field of Classification Search
CPC ......... H04W 52/0219; H04W 52/0229; H04W 76/28; H04W 76/27; H04W 92/18; H04W 4/023; H04W 4/40; H04W 4/44; H04W 4/46; H04W 76/14
USPC ....................................................... 455/522
See application file for complete search history.

(56) References Cited

U.S. PATENT DOCUMENTS

2021/0227604 A1* 7/2021 Huang ................. H04W 76/14

FOREIGN PATENT DOCUMENTS

WO WO-2019095323 A1 5/2019

OTHER PUBLICATIONS

Lenovo, Motorola Mobility: "UE-group wake-up signal for Rel-16 MT," 3GPP TSG RAN WG1 Meeting #96bis, R1-1904565, FL Summary 6.2.1.1, 3rd Generation Partnership Project (3GPP), Xi'an, China, Apr. 8-12, 2019, 4 pages.

(Continued)

*Primary Examiner* — Philip Sobutka
(74) *Attorney, Agent, or Firm* — Harrity & Harrity, LLP

(57) ABSTRACT

Various aspects of the present disclosure generally relate to wireless communication. In some aspects, a base station may configure a group wake-up signal based at least in part on a sidelink zone identifier that corresponds to a geographical area. The base station may transmit the group wake-up signal to collectively wake up at least a subset of user equipments (UEs) that are located in the geographical area corresponding to the sidelink zone identifier. Numerous other aspects are provided.

30 Claims, 9 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical channels and modulation (Release 16)", 3GPP Standard; Technical Specification, 3GPP TS 36.211, 3rd Generation Partnership Project (3GPP), Mobile Competence Centre, 650, Route Des Lucioles, F-06921, Sophia-Antipolis Cedex, France, vol. RAN WG1. No. V16.1.0, Apr. 3, 2020 (Apr. 3, 2020), 247 pages, XP051893783, Retrieved from the Internet: URL: http://ftp.3gpp.org/Specs/archive/36_series/36.211/36211-g10.zip 36211-g10_s09-sxx.docx [retrieved on Apr. 3, 2020] Section 9.

"3rd Generation Partnership Project; Technical Specification Group Radio Access Network; Evolved Universal Terrestrial Radio Access (E-UTRA); User Equipment (UE) procedures in idle mode (Release 16)", 3GPP Standard, Technical Specification, 3GPP TS 36.304, 3rd Generation Partnership Project (3GPP), Mobile Competence Centre, 650, Route Des Lucioles, F-06921, Sophia-Antipolis Cedex, France, vol. RAN WG2. No. V16.0.0, Apr. 8, 2020 (Apr. 8, 2020), pp. 1-58. XP051893876, Retrieved from the Internet: URL: http://ftp.3gpp.org/Specs/archive/36_series/36.304/36304-g00.zip 36304-g00.docx [retrieved on Apr. 8, 2020] Sections 7.4, 7.5.

International Search Report and Written Opinion—PCT/US2021/024060—ISA/EPO—dated Jun. 24, 2021.

Qualcomm Incorporated: "Text Proposal for WUS Description in TS 36.304," 3GPP Draft, 3GPP TSG RAN WG2 #109-e, R2-2000307, 3rd Generation Partnership Project (3GPP), Mobile Competence Centre, 650, Route Des Lucioles, F-06921, Sophia-Antipolis Cedex, France, vol. RAN WG2. No. Feb. 24, 2020-Mar. 6, 2020, Feb. 13, 2020 (Feb. 13, 2020), XP051848525, 11 pages, Retrieved from the Internet: URL: https://ftp.3gpp.org/tsg_ran/WG2_RL2/TSGR2_109_e/Docs/R2-2000307.zip R2-2000307 Group WUS text proposal for 36.304.docx [retrieved on Feb. 13, 2020] Section 7.x.

* cited by examiner

GROUP WAKE-UP SIGNALING USING SIDELINK ZONE IDENTIFIER

CROSS-REFERENCE TO RELATED APPLICATION

This Patent Application claims priority to U.S. Provisional Patent Application No. 63/019,679, filed on May 4, 2020, entitled "GROUP WAKE-UP SIGNALING USING SIDELINK ZONE IDENTIFIER," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for group wake-up signaling using a sidelink zone identifier.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a base station, may include: configuring a group wake-up signal based at least in part on a sidelink zone identifier that corresponds to a geographical area; and transmitting the group wake-up signal to collectively wake up at least a subset of user equipments (UEs) located in the geographical area corresponding to the sidelink zone identifier.

In some aspects, a method of wireless communication, performed by a UE, may include: determining a sidelink zone identifier that corresponds to a geographical area in which the UE is located; and waking from a sleep state based at least in part on receiving a group wake-up signal that is based at least in part on the sidelink zone identifier, wherein the group wake-up signal is configured to collectively wake up at least a subset of UEs located in the geographical area corresponding to the sidelink zone identifier.

In some aspects, a base station for wireless communication may include a memory and one or more processors, coupled to the memory, configured to: configure a group wake-up signal based at least in part on a sidelink zone identifier that corresponds to a geographical area; and transmit the group wake-up signal to collectively wake up at least a subset of UEs located in the geographical area corresponding to the sidelink zone identifier.

In some aspects, a UE for wireless communication may include a memory and one or more processors, coupled to the memory, configured to: determine a sidelink zone identifier that corresponds to a geographical area in which the UE is located; and wake from a sleep state based at least in part on receiving a group wake-up signal that is based at least in part on the sidelink zone identifier, wherein the group wake-up signal is configured to collectively wake up at least a subset of UEs located in the geographical area corresponding to the sidelink zone identifier.

In some aspects, a non-transitory computer-readable medium may store one or more instructions for wireless communication. The one or more instructions, when executed by one or more processors of a base station, may cause the one or more processors to: configure a group wake-up signal based at least in part on a sidelink zone identifier that corresponds to a geographical area; and transmit the group wake-up signal to collectively wake up at least a subset of UEs located in the geographical area corresponding to the sidelink zone identifier.

In some aspects, a non-transitory computer-readable medium may store one or more instructions for wireless communication. The one or more instructions, when executed by one or more processors of a UE, may cause the one or more processors to: determine a sidelink zone identifier that corresponds to a geographical area in which the UE is located; and wake from a sleep state based at least in part on receiving a group wake-up signal that is based at least in part on the sidelink zone identifier, wherein the group wake-up signal is configured to collectively wake up at least a subset of UEs located in the geographical area corresponding to the sidelink zone identifier.

In some aspects, an apparatus for wireless communication may include: means for configuring a group wake-up signal based at least in part on a sidelink zone identifier that corresponds to a geographical area; and means for transmitting the group wake-up signal to collectively wake up at least a subset of UEs located in the geographical area corresponding to the sidelink zone identifier.

In some aspects, an apparatus for wireless communication may include: means for determining a sidelink zone identifier that corresponds to a geographical area in which the apparatus is located; and means for waking from a sleep state based at least in part on receiving a group wake-up signal that is based at least in part on the sidelink zone identifier, wherein the group wake-up signal is configured to collectively wake up at least a subset of UEs located in the geographical area corresponding to the sidelink zone identifier.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
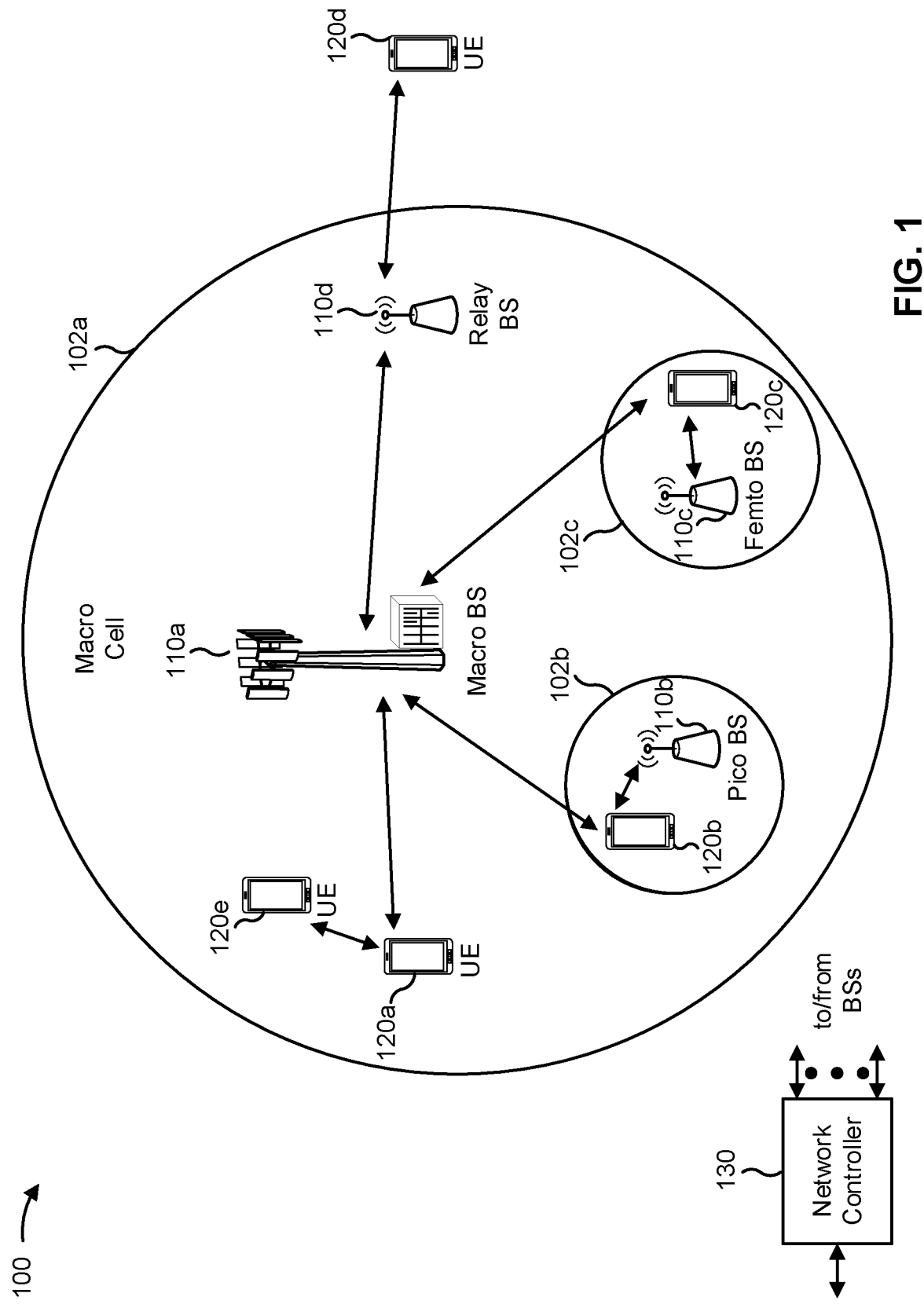
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, a vehicle-to-pedestrian (V2P) protocol, a vehicle-to-network (V2N) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
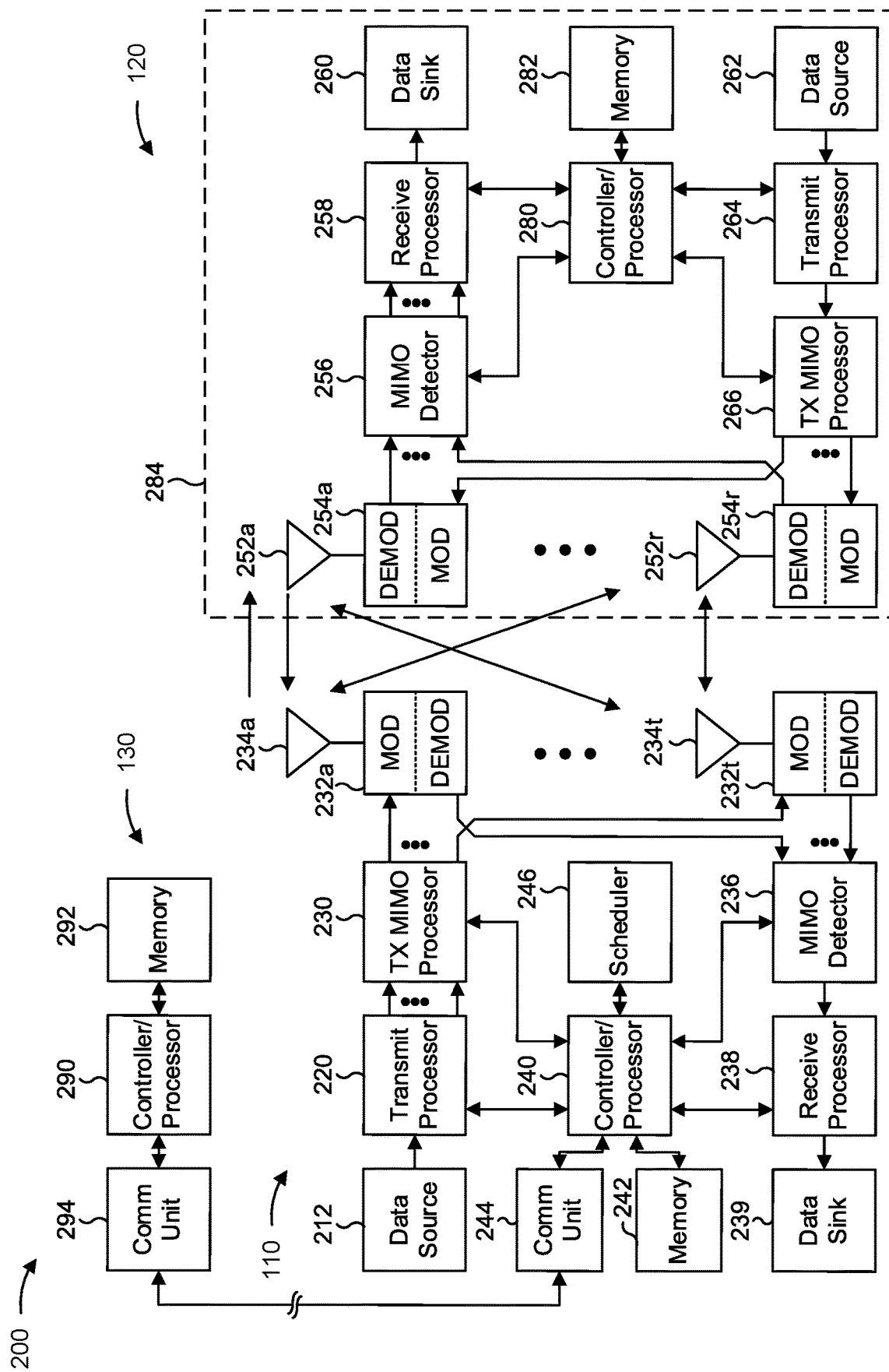
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), nd transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5A-5C, FIG. 6, and/or FIG. 7).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5A-5C, FIG. 6, and/or FIG. 7).

Controller/processor 240 of base station 110, controller/processor 280 of UE 120, and/or any other component(s) of FIG. 2 may perform one or more techniques associated with group wake-up signaling using a sidelink zone identifier, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, UE 120 may include means for determining a sidelink zone identifier that corresponds to a geographical area in which UE 120 is located, means for waking from a sleep state based at least in part on receiving a group wake-up signal that is based at least in part on the sidelink zone identifier, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for configuring a group wake-up signal based at least in part on a sidelink zone identifier that corresponds to a geographical area, means for transmitting the group wake-up signal to collectively wake up at least a subset of UEs 120 located in the geographical area corresponding to the sidelink zone identifier, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
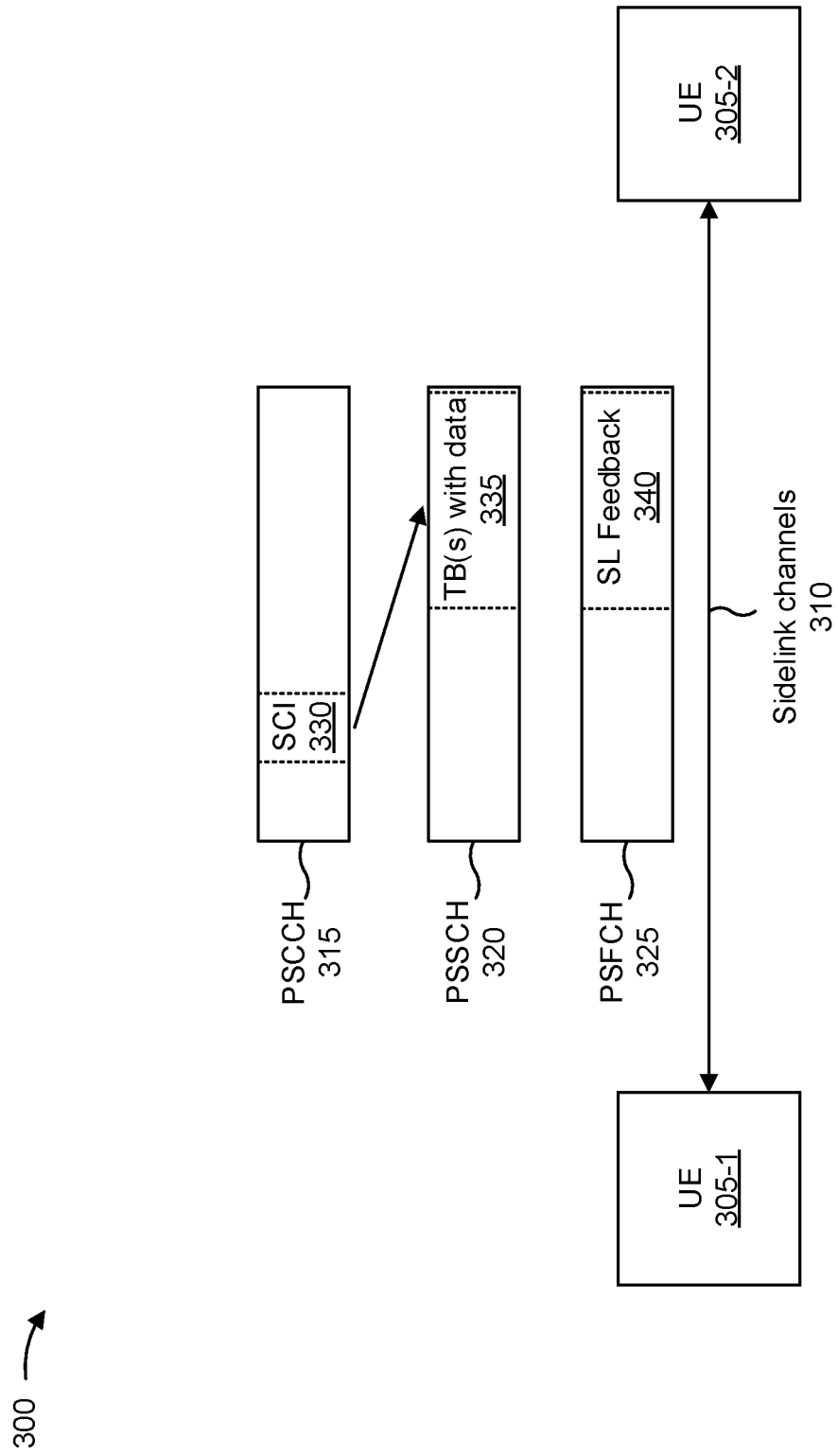
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V21 communications, V2P communications, V2N communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
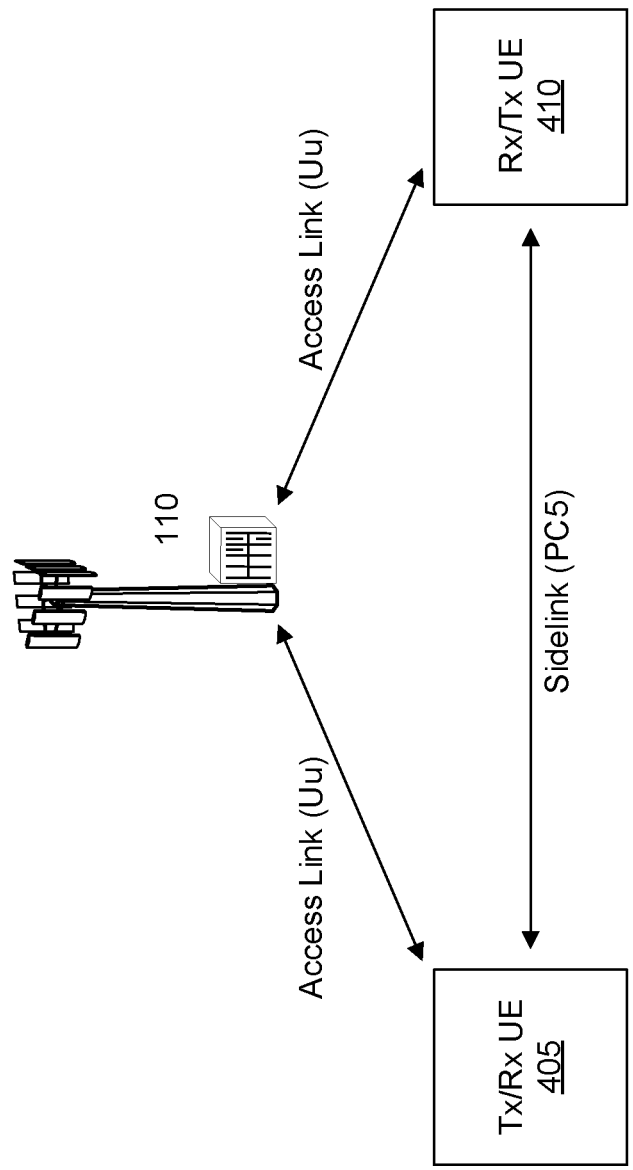
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown in FIG. 4, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. In some aspects, the Tx/Rx UE 405 and/or the Rx/Tx UE 410 may correspond to one or more UEs described elsewhere herein, such as the UE 120 of FIG. 1, the UE(s) 305 of FIG. 3, and/or the like. Thus, a direct link between Tx/Rx UE 405 and Rx/Tx UE 410 (e.g., via a PC5 interface) may be referred to as a sidelink, and a direct link between the base station 110 and the Tx/Rx UE 405 and/or the Rx/Tx UE 410 (e.g., via a Uu interface) may be referred to as an access link. In some aspects, sidelink communications may be transmitted via the sidelink, and access link communications may be transmitted via the access link(s). An access link communication may be either a downlink communication (from the base station 110 to Tx/Rx UE 405 or Rx/Tx UE 410) or an uplink communication (from Tx/Rx UE 405 or Rx/Tx UE 410 to the base station 110).

In some aspects, the base station 110 and the UEs 405, 410 may be deployed in a radio access network that utilizes millimeter wave (mmW) technology and/or directional communications (e.g., beamforming, precoding, and/or the like) for communications among base stations and/or UEs (e.g., between two base stations, between two UEs, and/or between a base station and a UE). In some aspects, mmW communications may be performed in FR2, which includes frequency bands from 24.25 GHz to 52.6 GHz. In some aspects, wireless backhaul links between base stations 110 may use mmW signals to carry information and/or may be directed toward a target base station 110 using beamforming, precoding, and/or the like. Similarly, wireless access links between the UEs 405, 410 and the base station 110 may use mmW signals and/or may be directed toward a target wireless node (e.g., a UE and/or a base station). Sidelink communications between the UEs 405, 410 may be performed using mmW technology and/or beamforming such that the UEs 405, 410 may direct or otherwise steer one or more transmissions towards one another and/or receive transmissions from a particular direction by using different weighting patterns to amplify a signal received at different antennas.

Accordingly, as described herein, wireless communication devices (e.g., UEs, base stations, and/or the like) may use beamforming to improve radio performance, increase throughput and reliability, and/or the like. This may be particularly useful in mmW communication systems, in which high operating frequencies can lead to significant path loss. For example, because mmW communications have a higher frequency and a shorter wavelength than various other radio waves used for communications (e. g., sub-6 GHz communications), mmW communications may have shorter propagation distances, may be subject to atmospheric attenuation, may be more easily blocked by obstructions than other types of radio waves, and/or the like. Accordingly, to improve radio performance, mitigate path loss, and/or the like, mmW communications may be performed using beamforming, in which a transmitting wireless communication device may generate a transmit beam, and a receiving wireless communication device may generate a corresponding receive beam. The transmit beam may be reflected, diffracted, scattered, and/or the like by one or more clusters, obstacles, materials, and/or the like within an environment between or around the transmitting and receiving devices. The term "cluster" may refer to objects in the channel environment through which energy propagates. Example clusters in mmW channel environments may include reflectors such as lamp posts, vehicles, glass/window panes, metallic objects, and/or the like, diffractors such as edges or corners of buildings, walls, and/or the like, and/or scattering via irregular objects such as walls, human bodies, and/or the like.

While mmW communications offer various advantages, such as improved radio performance, increased throughput and reliability, and/or the like, mmW communications also present various challenges. For example, in contrast to sub-6 GHz relaying, mmW relaying and/or mmW sidelink communications may use a larger number of antenna elements in order to support directional beams that have a narrower width and therefore a longer range (e.g., mmW beams may have a beamwidth of 20 to 30 degrees (or an even narrower beamwidth if a UE has a large number of antenna elements), whereas beams used in sub-6 GHz relaying tend to have a beamwidth in a range from 90 to 120 degrees). As a result, power consumption can become a serious issue in mmW communications, especially for UEs operating on battery power. Furthermore, due to the significant power that may be consumed by mmW communications, thermal issues may arise due to the need to dissipate the power, and UEs may need to take a power backoff (e.g., a power management maximum power reduction (P-MPR)) when transmitting (e.g., on an uplink and/or a sidelink) in order to comply with maximum permissible exposure (MPE) requirements that are typically established by regulatory bodies.

Accordingly, because of the various challenges that arise due to the power demands of mmW communications, UEs that communicate using mmW technology may spend a significant amount of time in a sleep state (or other low-power mode). However, in order to communicate using beamforming, UEs may need to be aware of a direction in which to beamform. In some cases, a base station may indicate the appropriate beamforming direction for one or more in-coverage UEs to enable discovery of other UEs, but the base station may not be able to indicate the appropriate beamforming direction for out-of-coverage UEs and/or may not have sufficient information to enable discovery among all UEs. As a result, because sidelink communications using mmW technology may depend on an ability of UEs to discover each other, UEs that are in proximity to one another should generally be awake at the same time (or at least during overlapping times). Otherwise, if a first UE is in a sleep state while a second UE is performing a discovery operation (or vice versa), the first UE and the second UE will be unable to discover each other.

In some wireless networks, a group wake-up signal may be used to collectively wake various UEs at the same time. For example, in some cases, group wake-up signals are sometimes used to collectively wake up multiple UEs in eMTC, IoT, and/or other applications according to a UE identifier, a base station identifier, and/or the like. In other cases, techniques based on group wake-up signals may be configured to collectively wake up multiple UEs that have similar coverage, similar discontinuous reception (DRX) and gap configurations, or similar classes, or offer comparable services, and/or the like. However, these group wake-up techniques are generally not specifically tailored to mmW (or FR2) communications where UEs that are in the same neighborhood (e.g., geographical area) may need to be awake simultaneously in order to enable discovery processes that UEs rely upon to determine a direction in which to beamform. Accordingly, some aspects described herein relate to techniques and apparatuses to parameterize a group wake-up signal according to a sidelink zone identifier. For example, as described herein, the sidelink zone identifier may correspond to a geographical area, whereby a distance between sidelink UEs can be inferred from respective sidelink zone identifiers (e.g., UEs in different sidelink zones may be geographically farther apart than UEs in the same sidelink zone). Accordingly, in some aspects, a base station may configure a group wake-up signal to collectively wake up one or more UEs that are located in the geographical area by parameterizing the group wake-up signal according to the sidelink zone identifier. In this way, the UEs that are located in the geographical area may wake up at substantially the same time and may then perform sidelink discovery operations to enable sidelink communications.

As indicated above, FIG. 4 is provided as an example. Other examples may differ from what is described with respect to FIG. 4.

Figure 5A:
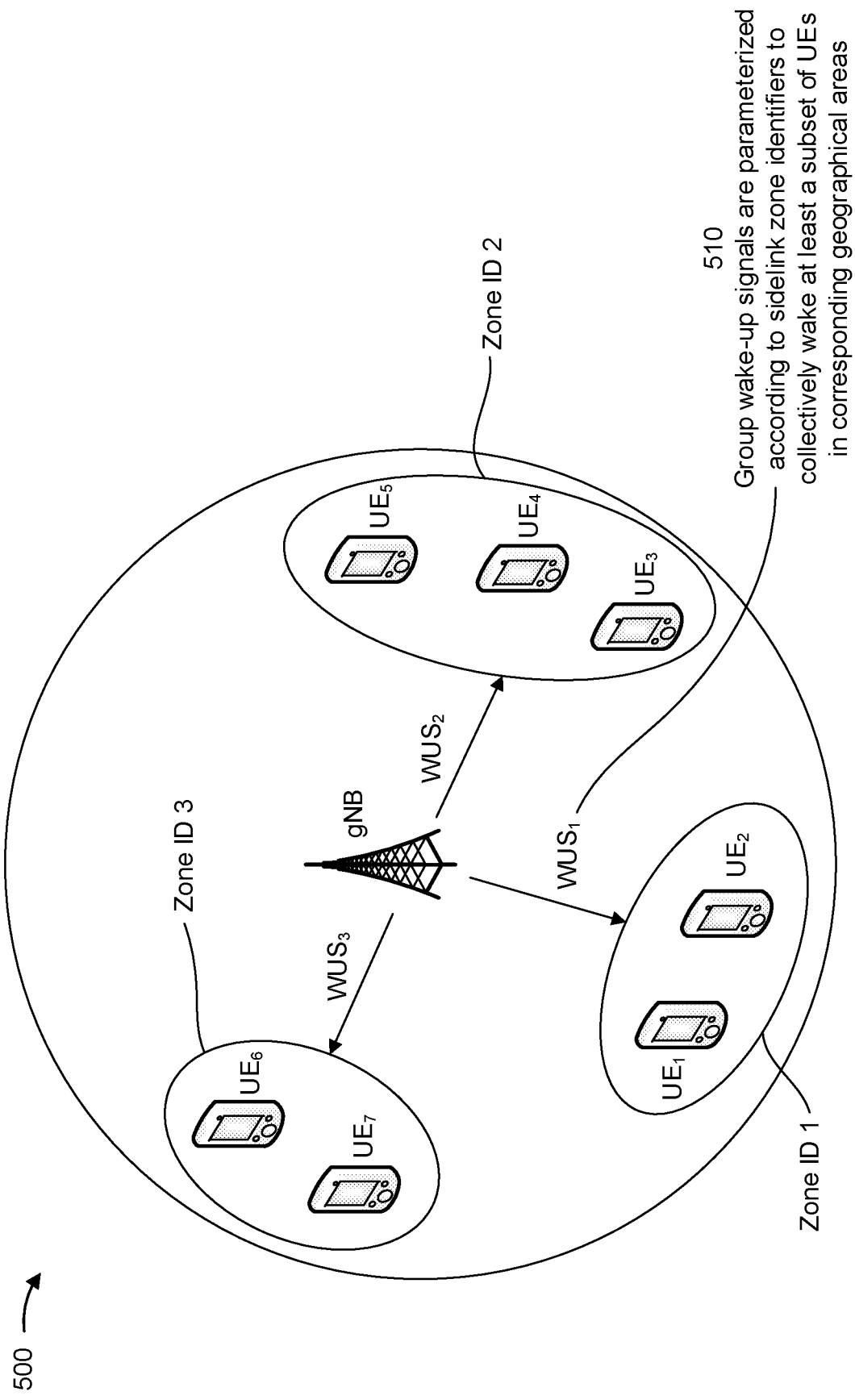
FIGS. 5A-5C are diagrams illustrating one or more examples of group wake-up signaling using a sidelink zone identifier, in accordance with the present disclosure.
Figure 5B:
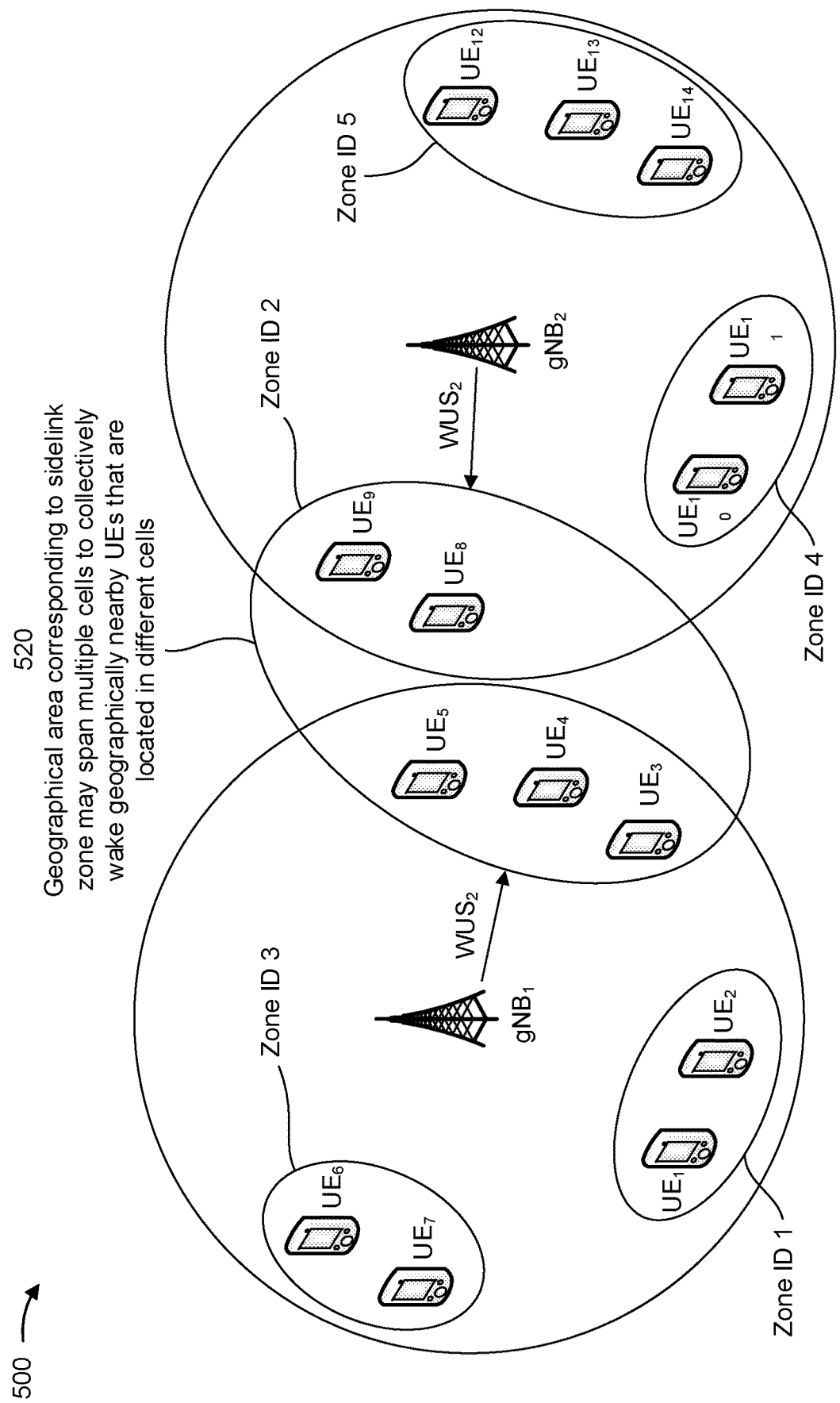
Figure 5C:
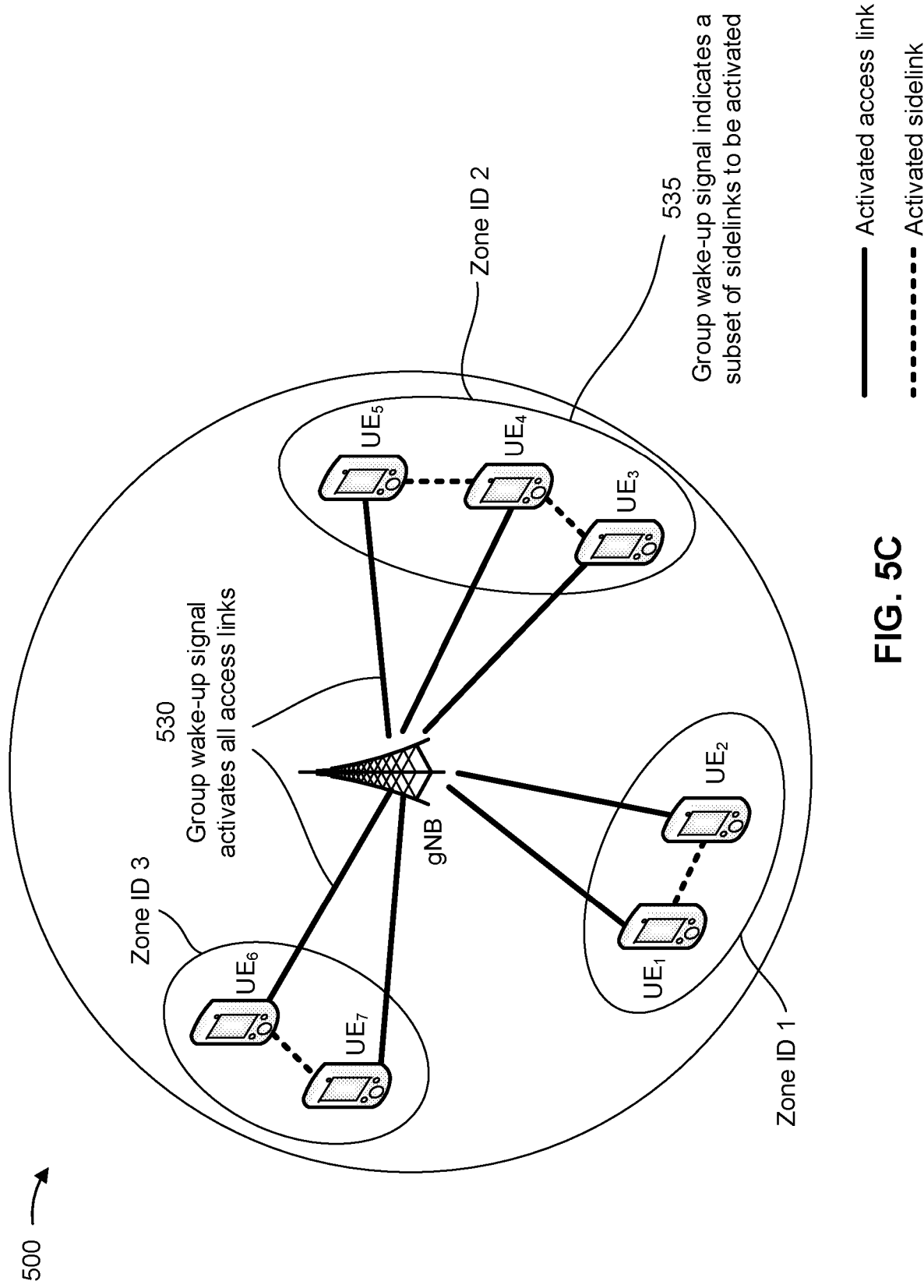

FIGS. 5A-5C are diagrams illustrating one or more examples 500 of group wake-up signaling using a sidelink zone identifier, in accordance with the present disclosure. As shown in FIGS. 5A-5C, example(s) 500 include various UEs (e.g., UE1, UE2, UE3, and/or the like, each of which may correspond to a UE 120) and one or more base stations (e.g., base station 110). In some aspects, the various UEs and the base station(s) may be included in a wireless network such as wireless network 100. In some aspects, the UEs may communicate via a wireless sidelink, and the UEs may communicate with the base station(s) via respective access links.

As shown in FIG. 5A, the various UEs may be located in a coverage area (e.g., a cell) provided by a base station. Accordingly, in some aspects, the base station may store information related to an identifier associated with each UE (e.g., a cell radio network temporary identity (C-RNTI), a serving temporary mobile subscriber identity (S-TMSI), a temporary identity used in next update (TIN), and/or the like), and the base station may further know approximate locations of each UE (e.g., based on location information periodically reported by the UEs, measurements associated with signals transmitted by the UEs, and/or the like). Furthermore, in some aspects, each UE may be assigned a sidelink zone identifier that corresponds to a geographical area in which the respective UE is located. For example, in some aspects, a geographical area may be partitioned into contiguous sidelink zones, and each sidelink zone may be a particular size and shape. In some aspects, the sidelink zones may be the same size and shape, or the sizes and/or the shapes of at least a subset of the sidelink zones may be different. For example, in some aspects, dimensions of a sidelink zone may be defined by a sidelink zone configuration parameter (e.g., a radio resource control (RRC) parameter, such as an SL-ZoneConfig information element). For example, the sidelink zone configuration parameter may indicate a length and width of the geographical area corresponding to each sidelink zone, a total number of sidelink zones that are configured with respect to latitude and longitude, and/or the like. Accordingly, the geographical area partitioned into the contiguous sidelink zones may be associated with a fixed reference point (e.g., geographical coordinates (0,0)) that may be used to determine sidelink zone identifiers that correspond to respective geographical areas in which the UEs are located.

For example, in some aspects, each sidelink zone may be assigned an identifier such that the sidelink zones may be indexed in a table, a wireless communication standard, a data structure, a wireless communication specification, and/or the like. The identifiers assigned to the sidelink zones may be numbered identifiers (e.g., Sidelink Zone 0 through Sidelink Zone 11), lettered identifiers (e.g., Sidelink Zone A through Sidelink Zone G), or other types of identifiers. In some aspects, the identifiers used for the sidelink zones may be defined according to an N-bit index that wraps around or repeats after a particular number of identifiers are used such that the number of identifiers in use may be reduced while still permitting sidelink zones to be uniquely identified within a portion of the geographic area. For example, in some aspects, the N-bit index (or identifier) corresponding to a sidelink zone associated with a geographical area in which a particular UE is located may be determined by the UE and/or the base station according to a modulo operator using the length and width of each sidelink zone, the number of sidelink zones that are configured with respect to latitude and longitude, the fixed reference point, and the geographical coordinates that correspond to the current location of the particular UE. For example, in FIG. 5A, $UE_1$ and $UE_2$ may be determined to be located within a first sidelink zone associated with a first sidelink zone identifier (e.g., Zone ID 1), $UE_3$, $UE_4$, and $UE_5$ may be determined to be located within a second sidelink zone associated with a second sidelink zone identifier (e.g., Zone ID 2), and $UE_6$ and $UE_7$ may be determined to be located within a third sidelink zone associated with a third sidelink zone identifier (e.g., Zone ID 3).

In some aspects, the size and shape of each sidelink zone may be a known and well-defined configuration such that use of sidelink zones may allow for distance determinations between two UEs. For example, UEs that are located in the same sidelink zone may generally be considered geographically close to one another, and UEs that are located in different sidelink zones may generally be considered geographically far apart (e.g., compared to UEs in the same sidelink zone). Additionally, or alternatively, the distance between two UEs may be inferred based at least in part on a number of sidelink zones between the two UEs. For example, assuming that a sidelink zone has a configuration with a width of 500 meters and a length of 100 meters, then the maximum distance between two UEs that are located in the same sidelink zone is 500 meters. In another example, if there are two sidelink zones between respective sidelink zones in which two UEs are located, then a coarse approximation of the maximum distance separating the two UEs would be 2000 meters. Accordingly, as described herein, the sidelink zones in which UEs are located may provide a coarse estimate of the geographical locations of the UEs, the geographical distance or proximity between UEs, and/or the like, whereby a group wake-up signal may be parameterized according to a sidelink zone identifier to collectively wake up at least a subset of UEs that are located in a particular geographic region. In this way, the UEs that are collectively woken up by the group wake-up signal may perform an autonomous discovery operation to discover other UEs that are geographically nearby such that the UEs can then engage in sidelink communications.

For example, as shown in FIG. 5A, and by reference number 510, a base station may parameterize one or more group wake-up signals according to sidelink zone identifiers in order to collectively wake up at least a subset of UEs that are located in geographical areas corresponding to particular sidelink zone identifiers. For example, in some aspects, UEs may enter a sleep state or other low-power state to conserve battery resources, processor resources, radio resources, and/or the like, and the UEs may include a particular module or sub-system, referred to herein as a wake-up receiver, to detect the group wake-up signal. When the wake-up receiver detects a group wake-up signal that is parameterized according to the sidelink zone identifier that corresponds to the geographical area in which the UE is located, a modem and/or an entire communication chain (e.g., any combination of antenna 252, MOD 254, MIMO detector 256, receive processor 258, controller/processor 280, and/or the like) may enter an active state to receive a control channel and subsequent shared channel. For example, in some aspects, the group wake-up signal may be an analog waveform, such as an on-off keying (OOK)-based tone, a preamble, a reference signal, and/or the like that is generated as a function of one or more parameters. Accordingly, as described herein, the one or more parameters used to generate the group wake-up signal may include at least a sidelink zone identifier, whereby a set of parameters associated with the group wake-up signal may be an explicit and/or implicit function of the sidelink zone identifier. In this way, all UEs that are located in a geographical area that corresponds to a particular sidelink zone identifier may have the same wake-up signal parameters, and different sidelink zone identifiers may be associated with different wake-up signal parameters. In other words, a group wake-up signal that is parameterized according to a particular sidelink zone identifier may wake up at least a subset of the UEs in the corresponding sidelink zone. Furthermore, in some aspects, the group wake-up signal may not awaken one or more UEs that are located in different sidelink zones.

Accordingly, in some aspects, the base station may determine a sidelink zone identifier associated with a subset of UEs to be woken up, and may generate a group wake-up signal that includes a wake-up signal parameter configuration that is an explicit or implicit function of the sidelink zone identifier. For example, as shown in FIG. 5A, the base station may generate and transmit a first group wake-up signal ($WUS_1$) to collectively wake up at least a subset of the UEs that are located in a geographical area corresponding to a first sidelink zone identifier (e.g., Zone ID 1), may generate and transmit a second group wake-up signal ($WUS_2$) to collectively wake up at least a subset of the UEs that are located in a geographical area corresponding to a second sidelink zone identifier (e.g., Zone ID 2), may generate and transmit a third group wake-up signal ($WUS_3$) to collectively wake up at least a subset of the UEs that are located in a geographical area corresponding to a third sidelink zone identifier (e.g., Zone ID 3), and/or the like. Accordingly, while in a sleep state or other low-power state, a UE may monitor an access link (e.g., a PDCCH) for a group wake-up signal that is parameterized based at least in part on the sidelink zone identifier that corresponds to the geographical area in which the UE is located, and may wake up or otherwise transition to an active state based at least in part on detecting such a group wake-up signal. Furthermore, in an mmW communication, the base station may beam sweep the group wake-up signal over multiple wake-up beams that are directionally steered towards the geographical area that corresponds to the sidelink zone identifier, thereby improving spatial and time diversity of the wake-up signal, reducing the likelihood of failure of detection due to beam degradation, conserving resources by avoiding transmitting the group wake-up signal in directions that are away from the geographical area of the UEs to be woken up, and/or the like.

In some aspects, as described above, a UE may generally monitor an access link for a group wake-up signal that is parameterized based at least in part on the sidelink zone identifier corresponding to the geographical area in which the UE is located. Furthermore, in some aspects, the UE may additionally monitor the access link for a group wake-up signal that is parameterized according to the identifier(s) associated with one or more neighboring sidelink zones. For example, a mobile UE may move between different sidelink zones as the UE changes geographical location, whereby UEs may monitor for group wake-up signals that are parameterized according to the identifier(s) associated with neighboring sidelink zones may ensure that the UEs are awake at the same time as UEs in the neighboring sidelink zones, in case of potential and/or likely movement into the neighboring sidelink zones. Furthermore, in some cases, the one or more neighboring sidelink zones may be located in the same cell as a serving base station, in a neighboring cell, and/or the like, whereby monitoring for the group wake-up signal associated with the neighboring sidelink zones may facilitate a potential and/or likely handover from the serving base station to a neighboring base station. In some aspects, a base station may indicate the neighboring sidelink zone identifiers that a particular UE is to monitor, and different base stations may communicate via a backhaul to determine neighboring sidelink zones to be monitored across different cells. Additionally, in some aspects, a UE may continue to monitor for a group wake-up signal associated with a sidelink zone in which the UE was previously located for a certain time period after changing sidelink zones. In this way, the continued monitoring of the group wake-up signal associated with the previous sidelink zone may provide a hysteresis function in case the UE changes location again and moves back into the previous sidelink zone.

In some aspects, as shown in FIG. 5B, and by reference number 520, a geographical area that corresponds to a particular sidelink zone may span multiple cells. For example, in some aspects, sidelink zone identifiers may be clustered together across multiple cells such that UEs that are in geographical proximity can have the same group wake-up signal parameters despite being located in different cells. For example, as shown in FIG. 5B, a geographical area that corresponds to a sidelink zone having identifier 'Zone ID 2' includes a first portion that is located in a first cell provided by a first base station and a second portion located in a second cell provided by a second base station. Accordingly, by clustering the sidelink zone across multiple cells provided by different base stations, geographically nearby UEs can be collectively woken up at the same time. For example, as shown in FIG. 5B, base stations in neighboring cells may each transmit a PDCCH that includes a group wake-up signal that is parameterized according to the sidelink zone identifier 'Zone ID 2' in order to collectively wake up all (or a subset) of the UEs located in the corresponding geographical area. For example, in FIG. 5B, a first base station ($gNB_1$) may transmit a group wake-up signal ($WUS_2$) to collectively wake up $IC_3$, $UE_4$, and $UE_5$ located in the cell provided by the first base station, and a second base station ($gNB_2$) may transmit the same group wake-up signal to collectively wake up $UE_8$ and $UE_9$ located in the cell provided by the second base station. In this way, by clustering the sidelink zones across different cells, UEs may be monitored more easily within a broader geographical area, which may facilitate handovers across different base stations, TRPs, and/or the like. Furthermore, in some aspects, base stations in neighboring cells may communicate (e.g., via a backhaul) to configure the geographical area that corresponds to a sidelink zone spanning multiple cells. For example, in some aspects, the neighboring base stations may exchange information related to network-level statistical metrics related to geographical proximity among UEs located within the respective cells to determine the appropriate geographical configuration for a particular sidelink zone clustered across different cells.

In some aspects, as shown in FIG. 5C, a group wake-up signal may be configured to wake up or otherwise activate a subset of links within a geographical area that corresponds to a particular sidelink zone identifier. For example, as shown by reference number 530, the group wake-up signal may activate all access links (e.g., Uu links between the base station and the UEs) for the subset of UEs that are collectively woken up within a geographical area. Furthermore, as shown by reference number 535, the group wake-up signal may activate a subset of sidelinks (e.g., PC5 links between UEs) for the subset of UEs that are collectively woken up within the geographical area. For example, in FIG. 5C, the group wake-up signals for 'Zone ID 1' and 'Zone ID 3' wake up all access links and all sidelinks within the corresponding sidelink zones (e.g., the subset of the sidelinks that are woken up includes all of the sidelinks within the corresponding sidelink zones), but the group wake-up signal for 'Zone ID 2' wakes up only a portion of the sidelinks within the corresponding sidelink zone. For example, in FIG. 5C, the group wake-up signal for 'Zone ID 2' does not activate the sidelink between $UE_5$ and $UE_3$ (e.g., due to a distance between $UE_5$ and $UE_3$ satisfying a threshold). In some aspects, the base station may determine the subset of the sidelinks to be woken up or otherwise activated based on network-level statistical metrics (e.g., distances between UEs, knowledge related to which UEs are engaged or are not engaged in a sidelink session, and/or the like).

As indicated above, FIGS. 5A-5C are provided as one or more examples. Other examples may differ from what is described with respect to FIGS. 5A-5C.

Figure 6:
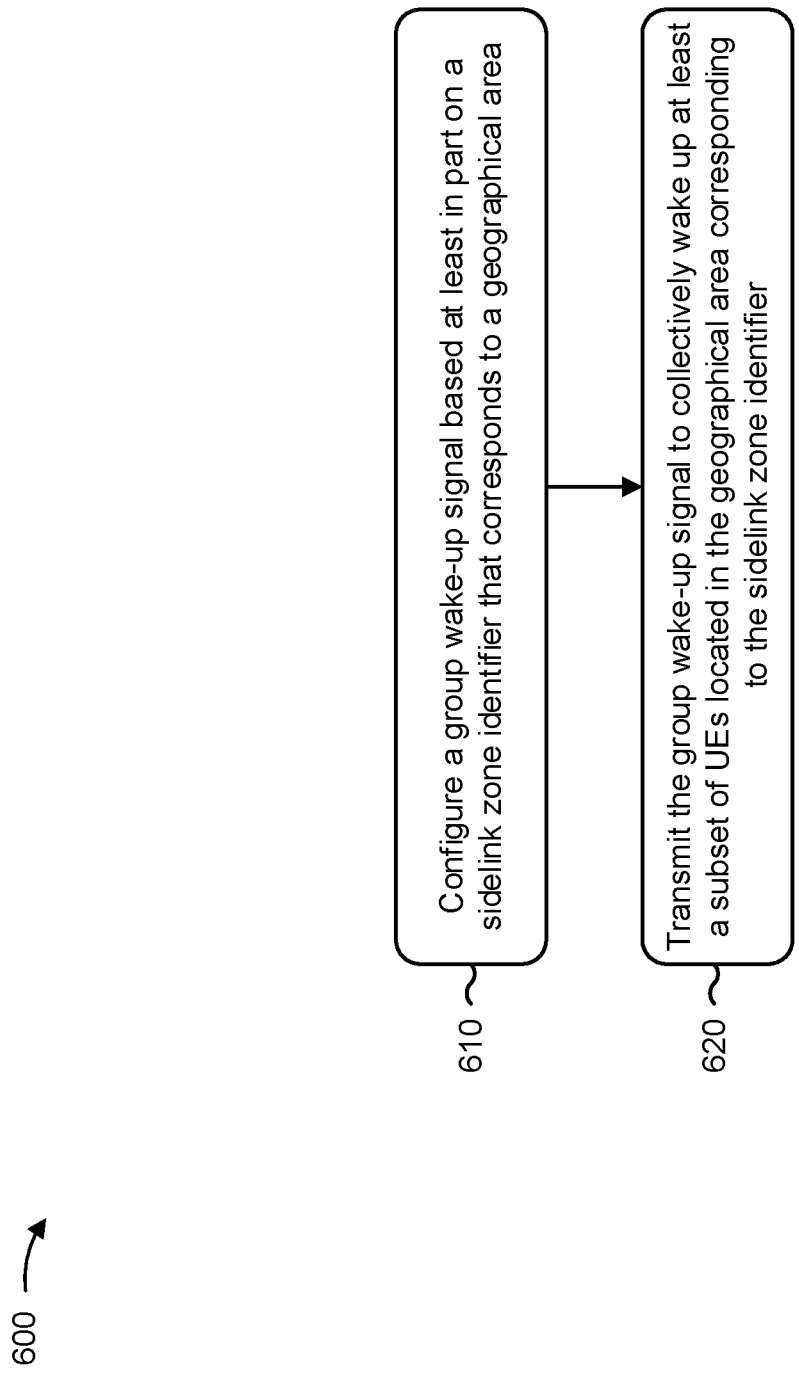
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110 and/or the like) performs operations associated with group wake-up signaling using a sidelink zone identifier.

As shown in FIG. 6, in some aspects, process 600 may include configuring a group wake-up signal based at least in part on a sidelink zone identifier that corresponds to a geographical area (block 610). For example, the base station may configure (e.g., using transmit processor 220, receive processor 238, controller/processor 240, memory 242, and/or the like) a group wake-up signal based at least in part on a sidelink zone identifier that corresponds to a geographical area, as described above.

As further shown in FIG. 6, in some aspects, process 600 may include transmitting the group wake-up signal to collectively wake up at least a subset of UEs located in the geographical area corresponding to the sidelink zone identifier (block 620). For example, the base station may transmit (e.g., using controller/processor 240, transmit processor 220, TX MIMO processor 230, MOD 232, antenna 234, memory 242, and/or the like) the group wake-up signal to collectively wake up at least a subset of UEs located in the geographical area corresponding to the sidelink zone identifier, as described above.

Process 600 may include additional aspects, such as any single aspect or any combination of aspects described below and/or in connection with one or more other processes described elsewhere herein.

In a first aspect, the group wake-up signal is associated with a parameter configuration that is based at least in part on the sidelink zone identifier.

In a second aspect, alone or in combination with the first aspect, the parameter configuration causes the group wake-up signal to collectively wake up the subset of the UEs located in the geographical area corresponding to the sidelink zone identifier without waking up one or more UEs located outside the geographical area corresponding to the sidelink zone identifier.

In a third aspect, alone or in combination with one or more of the first and second aspects, at least a portion of the geographical area that corresponds to the sidelink zone identifier is located in a neighboring cell.

In a fourth aspect, alone or in combination with one or more of the first through third aspects, process 600 includes communicating with a base station providing the neighboring cell to configure the geographical area that corresponds to the sidelink zone identifier based at least in part on one or more statistical metrics related to geographical proximity among UEs.

In a fifth aspect, alone or in combination with one or more of the first through fourth aspects, process 600 includes transmitting, to one or more of the UEs located in the geographical area corresponding to the sidelink zone identifier, information indicating one or more neighboring sidelink zone identifiers, where the one or more UEs monitor for the group wake-up signal associated with the sidelink zone identifier corresponding to the geographical area in which the one or more UEs are located and for group wake-up signals associated with the one or more neighboring sidelink zone identifiers.

In a sixth aspect, alone or in combination with one or more of the first through fifth aspects, the group wake-up signal activates an access link and at least a subset of sidelinks for each UE located in the geographical area corresponding to the sidelink zone identifier.

In a seventh aspect, alone or in combination with one or more of the first through sixth aspects, process 600 includes determining the subset of the sidelinks to be activated for each UE located in the geographical area corresponding to the sidelink zone identifier based at least in part on one or more network-level statistical metrics.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
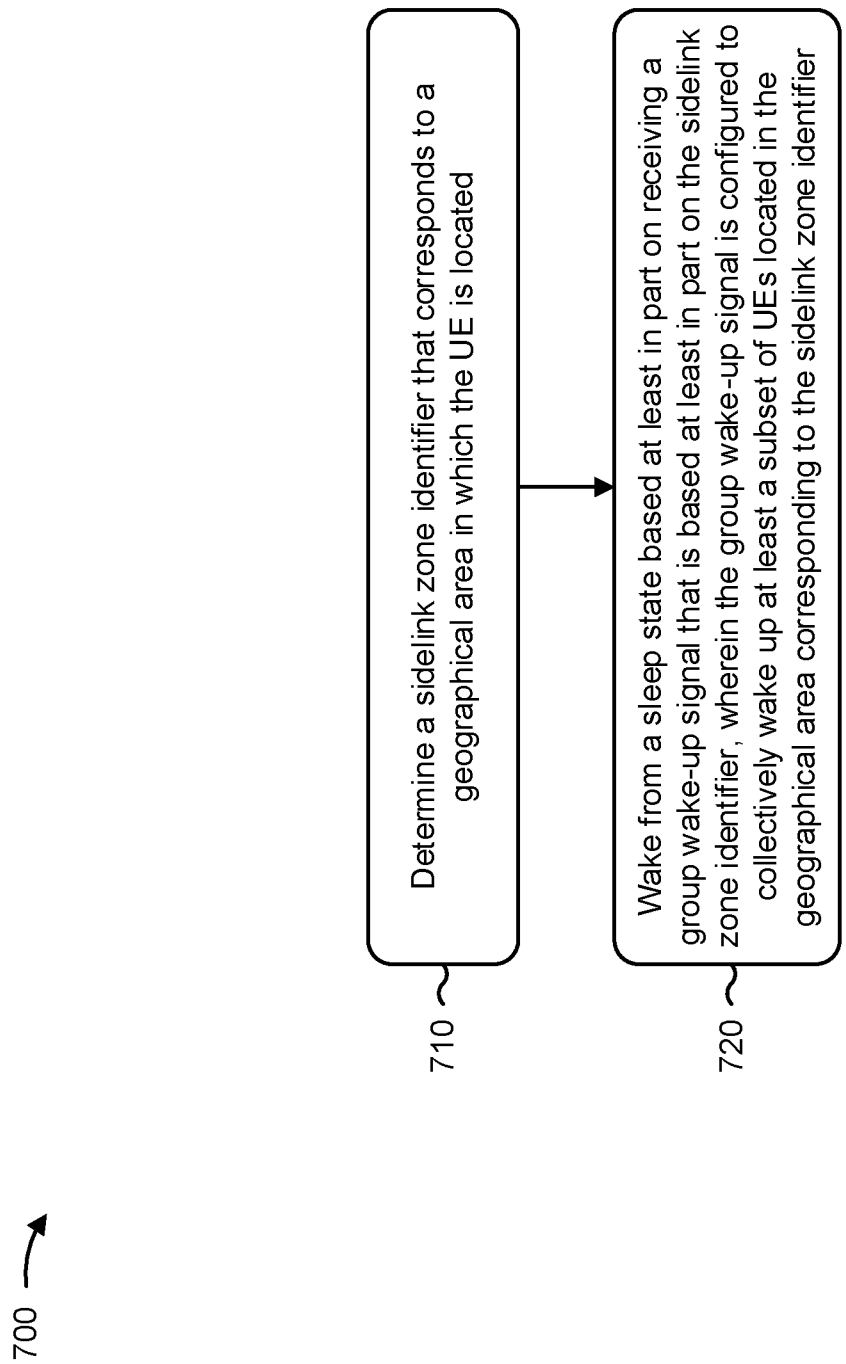
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120, UE 305, UE 405, UE 410, and/or the like) performs operations associated with group wake-up signaling using a sidelink zone identifier.

As shown in FIG. 7, in some aspects, process 700 may include determining a sidelink zone identifier that corresponds to a geographical area in which the UE is located (block 710). For example, the user equipment may determine (e.g., using controller/processor 280, memory 282, and/or the like) a sidelink zone identifier that corresponds to a geographical area in which the UE is located, as described above.

As further shown in FIG. 7, in some aspects, process 700 may include waking from a sleep state based at least in part on receiving a group wake-up signal that is based at least in part on the sidelink zone identifier, wherein the group wake-up signal is configured to collectively wake up at least a subset of UEs located in the geographical area corresponding to the sidelink zone identifier (block 720). For example, the UE may wake (e.g., using antenna 252, DEMOD 254, MIMO detector 256, receive processor 258, controller/processor 280, memory 282, and/or the like) from a sleep state based at least in part on receiving a group wake-up signal that is based at least in part on the sidelink zone identifier, as described above. In some aspects, the group wake-up signal is configured to collectively wake up at least a subset of UEs located in the geographical area corresponding to the sidelink zone identifier.

Process 700 may include additional aspects, such as any single aspect or any combination of aspects described below and/or in connection with one or more other processes described elsewhere herein.

In a first aspect, the group wake-up signal is associated with a parameter configuration that is based at least in part on the sidelink zone identifier.

In a second aspect, alone or in combination with the first aspect, the parameter configuration causes the group wake-up signal to collectively wake up the subset of the UEs located in the geographical area corresponding to the sidelink zone identifier without waking up one or more UEs located outside the geographical area corresponding to the sidelink zone identifier.

In a third aspect, alone or in combination with one or more of the first and second aspects, at least a portion of the geographical area that corresponds to the sidelink zone identifier is located in a neighboring cell.

In a fourth aspect, alone or in combination with one or more of the first through third aspects, process 700 includes receiving, from a base station, information indicating one or more neighboring sidelink zone identifiers, and monitoring for the group wake-up signal associated with the sidelink zone identifier corresponding to the geographical area in which the UE is located and for group wake-up signals associated with the one or more neighboring sidelink zone identifiers.

In a fifth aspect, alone or in combination with one or more of the first through fourth aspects, the group wake-up signal that causes the UE to wake up from the sleep state is associated with one or more of the sidelink zone identifier corresponding to the geographical area in which the UE is located or the one or more neighboring sidelink zone identifiers.

In a sixth aspect, alone or in combination with one or more of the first through fifth aspects, the UE further monitors for a group wake-up signal associated with a sidelink zone identifier corresponding to a geographical area in which the UE was previously located during a time period after entering the geographical area in which the UE is currently located.

In a seventh aspect, alone or in combination with one or more of the first through sixth aspects, the group wake-up signal activates an access link for the UE and at least a subset of sidelinks for the UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The following provides an overview of some Aspects of the present disclosure:

Aspect 1: A method of wireless communication performed by a base station, comprising: configuring a group wake-up signal based at least in part on a sidelink zone identifier that corresponds to a geographical area; and transmitting the group wake-up signal to collectively wake up at least a subset of UEs located in the geographical area corresponding to the sidelink zone identifier.

Aspect 2: The method of Aspect 1, wherein the group wake-up signal is associated with a parameter configuration that is based at least in part on the sidelink zone identifier.

Aspect 3: The method of Aspect 2, wherein the parameter configuration causes the group wake-up signal to collectively wake up the subset of the UEs located in the geographical area corresponding to the sidelink zone identifier without waking up one or more UEs located outside the geographical area corresponding to the sidelink zone identifier.

Aspect 4: The method of any of Aspects 1-3, wherein at least a portion of the geographical area that corresponds to the sidelink zone identifier is located in a neighboring cell.

Aspect 5: The method of Aspect 4, further comprising: communicating with a base station providing the neighboring cell to configure the geographical area that corresponds to the sidelink zone identifier based at least in part on one or more statistical metrics related to geographical proximity among UEs.

Aspect 6: The method of any of Aspects 1-5, further comprising: transmitting, to one or more of the UEs located in the geographical area corresponding to the sidelink zone identifier, information indicating one or more neighboring sidelink zone identifiers, wherein the one or more UEs monitor for the group wake-up signal associated with the sidelink zone identifier corresponding to the geographical area in which the one or more UEs are located and for group wake-up signals associated with the one or more neighboring sidelink zone identifiers.

Aspect 7: The method of any of Aspects 1-6, wherein the group wake-up signal activates an access link and at least a subset of sidelinks for each UE located in the geographical area corresponding to the sidelink zone identifier.

Aspect 8: The method of Aspect 7, further comprising: determining the subset of the sidelinks to be activated for each UE located in the geographical area corresponding to the sidelink zone identifier based at least in part on one or more network-level statistical metrics.

Aspect 9: A method of wireless communication performed by a UE, comprising: determining a sidelink zone identifier that corresponds to a geographical area in which the UE is located; and waking from a sleep state based at least in part on receiving a group wake-up signal that is based at least in part on the sidelink zone identifier, wherein the group wake-up signal is configured to collectively wake up at least a subset of UEs located in the geographical area corresponding to the sidelink zone identifier.

Aspect 10: The method of Aspect 9, wherein the group wake-up signal is associated with a parameter configuration that is based at least in part on the sidelink zone identifier.

Aspect 11: The method of Aspect 10, wherein the parameter configuration causes the group wake-up signal to collectively wake up the subset of the UEs located in the geographical area corresponding to the sidelink zone identifier without waking up one or more UEs located outside the geographical area corresponding to the sidelink zone identifier.

Aspect 12: The method of any of Aspects 9-11, wherein at least a portion of the geographical area that corresponds to the sidelink zone identifier is located in a neighboring cell.

Aspect 13: The method of any of Aspects 9-12, further comprising: receiving, from a base station, information indicating one or more neighboring sidelink zone identifiers; and monitoring for the group wake-up signal associated with the sidelink zone identifier corresponding to the geographical area in which the UE is located and for group wake-up signals associated with the one or more neighboring sidelink zone identifiers.

Aspect 14: The method of Aspect 13, wherein the group wake-up signal that causes the UE to wake up from the sleep state is associated with one or more of the sidelink zone identifier corresponding to the geographical area in which the UE is located or the one or more neighboring sidelink zone identifiers.

Aspect 15: The method of any of Aspects 13-14, wherein the UE further monitors for a group wake-up signal associated with a sidelink zone identifier corresponding to a geographical area in which the UE was previously located during a time period after entering the geographical area in which the UE is currently located.

Aspect 16: The method of any of Aspects 9-15, wherein the group wake-up signal activates an access link for the UE and at least a subset of sidelinks for the UE.

Aspect 17: An apparatus for wireless communication at a device, comprising a processor; memory coupled with the processor; and instructions stored in the memory and executable by the processor to cause the apparatus to perform the method of any of Aspects 1-8.

Aspect 18: A device for wireless communication, comprising a memory and one or more processors coupled to the memory, the memory and the one or more processors configured to perform the method of any of Aspects 1-8.

Aspect 19: An apparatus for wireless communication, comprising at least one means for performing the method of any of Aspects 1-8.

Aspect 20: A non-transitory computer-readable medium storing code for wireless communication, the code comprising instructions executable by a processor to perform the method of any of Aspects 1-8.

Aspect 21: A non-transitory computer-readable medium storing a set of instructions for wireless communication, the set of instructions comprising one or more instructions that, when executed by one or more processors of a device, cause the device to perform the method of any of Aspects 1-8.

Aspect 22: An apparatus for wireless communication at a device, comprising a processor; memory coupled with the processor; and instructions stored in the memory and executable by the processor to cause the apparatus to perform the method of any of Aspects 9-16.

Aspect 23: A device for wireless communication, comprising a memory and one or more processors coupled to the memory, the memory and the one or more processors configured to perform the method of any of Aspects 9-16.

Aspect 24: An apparatus for wireless communication, comprising at least one means for performing the method of any of Aspects 9-16.

Aspect 25: A non-transitory computer-readable medium storing code for wireless communication, the code comprising instructions executable by a processor to perform the method of any of Aspects 9-16.

Aspect 26: A non-transitory computer-readable medium storing a set of instructions for wireless communication, the set of instructions comprising one or more instructions that, when executed by one or more processors of a device, cause the device to perform the method of any of Aspects 9-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" s intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a base station, comprising:
   configuring a group wake-up signal based at least in part on a sidelink zone identifier that corresponds to a geographical area; and
   transmitting the group wake-up signal to collectively wake up at least a subset of user equipments (UEs), located in the geographical area corresponding to the sidelink zone identifier, and to activate one or more sidelinks associated with the subset of UEs and within the geographical area.

2. The method of claim 1, wherein the group wake-up signal is associated with a parameter configuration that is based at least in part on the sidelink zone identifier.

3. The method of claim 2, wherein the parameter configuration causes the group wake-up signal to collectively wake up the subset of the UEs located in the geographical area corresponding to the sidelink zone identifier without waking up one or more UEs located outside the geographical area corresponding to the sidelink zone identifier.

4. The method of claim 1, wherein at least a portion of the geographical area that corresponds to the sidelink zone identifier is located in a neighboring cell.

5. The method of claim 4, further comprising:
   communicating with a base station providing the neighboring cell to configure the geographical area that corresponds to the sidelink zone identifier based at least in part on one or more statistical metrics related to geographical proximity among UEs.

6. The method of claim 1, further comprising:
   transmitting, to one or more of the UEs located in the geographical area corresponding to the sidelink zone identifier, information indicating one or more neighboring sidelink zone identifiers, wherein the one or more UEs monitor for the group wake-up signal associated with the sidelink zone identifier corresponding to the geographical area in which the one or more UEs are located and for group wake-up signals associated with the one or more neighboring sidelink zone identifiers.

7. The method of claim 1, wherein the group wake-up signal activates an access link for the subset of UEs.

8. The method of claim 1, further comprising:
   determining the one or more sidelinks to be activated based at least in part on one or more network-level statistical metrics.

9. A method of wireless communication performed by a user equipment (UE), comprising:
   determining a sidelink zone identifier that corresponds to a geographical area in which the UE is located;
   waking from a sleep state based at least in part on receiving a group wake-up signal that is based at least in part on the sidelink zone identifier, wherein the group wake-up signal is configured to collectively wake up at least a subset of UEs located in the geographical area corresponding to the sidelink zone identifier; and
   activating one or more sidelinks associated with the UE and located in the geographical area based at least in part on receiving the group wake-up signal.

10. The method of claim 9, wherein the group wake-up signal is associated with a parameter configuration that is based at least in part on the sidelink zone identifier.

11. The method of claim 10, wherein the parameter configuration causes the group wake-up signal to collectively wake up the subset of the UEs located in the geographical area corresponding to the sidelink zone identifier without waking up one or more UEs located outside the geographical area corresponding to the sidelink zone identifier.

12. The method of claim 9, wherein at least a portion of the geographical area that corresponds to the sidelink zone identifier is located in a neighboring cell.

13. The method of claim 9, further comprising:
   receiving, from a base station, information indicating one or more neighboring sidelink zone identifiers; and
   monitoring for the group wake-up signal associated with the sidelink zone identifier corresponding to the geographical area in which the UE is located and for group wake-up signals associated with the one or more neighboring sidelink zone identifiers.

14. The method of claim 13, wherein the group wake-up signal that causes the UE to wake up from the sleep state is associated with one or more of the sidelink zone identifier corresponding to the geographical area in which the UE is located or the one or more neighboring sidelink zone identifiers.

15. The method of claim 13, wherein the UE further monitors for a group wake-up signal associated with a sidelink zone identifier corresponding to a geographical area in which the UE was previously located during a time period after entering the geographical area in which the UE is currently located.

16. The method of claim 9, wherein the group wake-up signal activates an access link for the UE.

17. A base station for wireless communication, comprising:
   a memory; and
   one or more processors, coupled to the memory, configured to:
      configure a group wake-up signal based at least in part on a sidelink zone identifier that corresponds to a geographical area; and
      transmit the group wake-up signal to collectively wake up at least a subset of user equipments located in the geographical area corresponding to the sidelink zone identifier, and to activate one or more sidelinks associated with the subset of UEs and located in the geographical area.

18. The base station of claim 17, wherein the group wake-up signal is associated with a parameter configuration that is based at least in part on the sidelink zone identifier.

19. The base station of claim 18, wherein the parameter configuration causes the group wake-up signal to collectively wake up the subset of the UEs located in the geographical area corresponding to the sidelink zone identifier without waking up one or more UEs located outside the geographical area corresponding to the sidelink zone identifier.

20. The base station of claim 17, wherein at least a portion of the geographical area that corresponds to the sidelink zone identifier is located in a neighboring cell.

21. The base station of claim 20, wherein the one or more processors are further configured to:
   communicate with a base station providing the neighboring cell to configure the geographical area that corresponds to the sidelink zone identifier based at least in part on one or more statistical metrics related to geographical proximity among UEs.

22. The base station of claim 17, wherein the one or more processors are further configured to:
   transmit, to one or more of the UEs located in the geographical area corresponding to the sidelink zone identifier, information indicating one or more neighboring sidelink zone identifiers, wherein the one or more UEs monitor for the group wake-up signal associated with the sidelink zone identifier corresponding to the geographical area in which the one or more UEs are located and for group wake-up signals associated with the one or more neighboring sidelink zone identifiers.

23. The base station of claim 17, wherein the group wake-up signal activates an access link for the subset of UEs.

24. A user equipment (UE) for wireless communication, comprising:
   a memory; and
   one or more processors, coupled to the memory, configured to:
      determine a sidelink zone identifier that corresponds to a geographical area in which the UE is located;
      wake from a sleep state based at least in part on receiving a group wake-up signal that is based at least in part on the sidelink zone identifier, wherein the group wake-up signal is configured to collectively wake up at least a subset of UEs located in the geographical area corresponding to the sidelink zone identifier; and
      activate one or more sidelinks associated with the UE and located in the geographical area based at least in part on receiving the group wake-up signal.

25. The UE of claim 24, wherein the group wake-up signal is associated with a parameter configuration that is based at least in part on the sidelink zone identifier.

26. The UE of claim 24, wherein at least a portion of the geographical area that corresponds to the sidelink zone identifier is located in a neighboring cell.

27. The UE of claim 24, wherein the one or more processors are further configured to:
   receive, from a base station, information indicating one or more neighboring sidelink zone identifiers; and
   monitor for the group wake-up signal associated with the sidelink zone identifier corresponding to the geographical area in which the UE is located and for group wake-up signals associated with the one or more neighboring sidelink zone identifiers.

28. The UE of claim 27, wherein the group wake-up signal that causes the UE to wake up from the sleep state is associated with one or more of the sidelink zone identifier corresponding to the geographical area in which the UE is located or the one or more neighboring sidelink zone identifiers.

29. The UE of claim 27, wherein the one or more processors are further configured to:
   monitor for a group wake-up signal associated with a sidelink zone identifier corresponding to a geographical area in which the UE was previously located during a time period after entering the geographical area in which the UE is currently located.

30. The UE of claim 24, wherein the group wake-up signal activates an access link for the UE.

* * * * *